Aug. 9, 1949.                    M. J. SCHOGER                    2,478,209
                              HUMANE CHICKEN KILLER
Filed Aug. 1, 1946                                              3 Sheets-Sheet 2

Martin J. Schoger
                INVENTOR
BY Victor J. Evans & Co.
                ATTORNEYS Aug. 9, 1949.　　　　M. J. SCHOGER　　　　2,478,209
HUMANE CHICKEN KILLER
Filed Aug. 1, 1946　　　　　　　　　　　　3 Sheets-Sheet 3
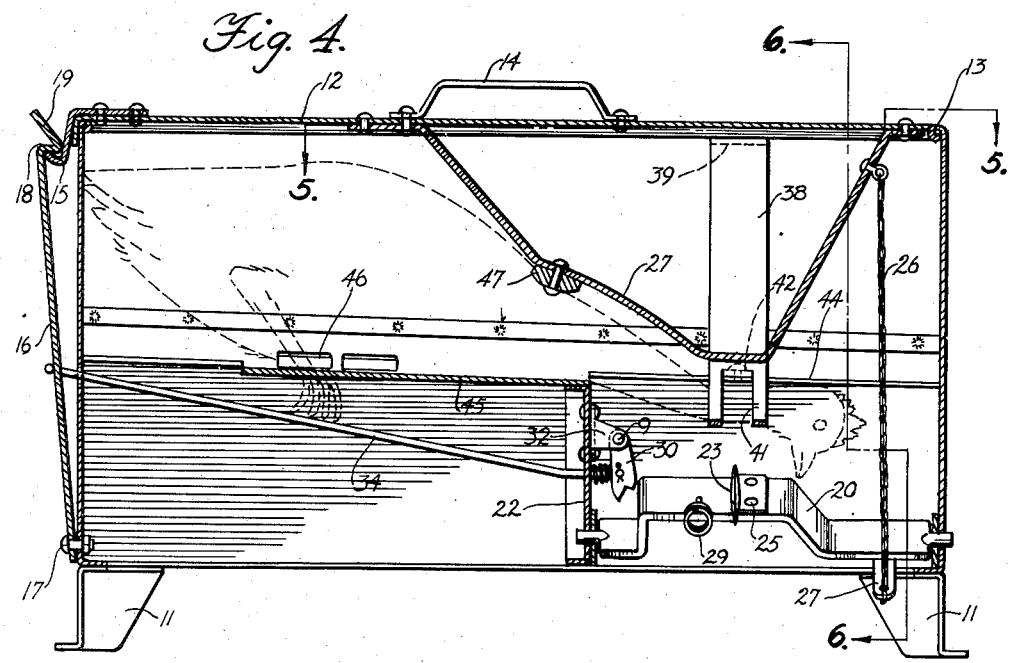
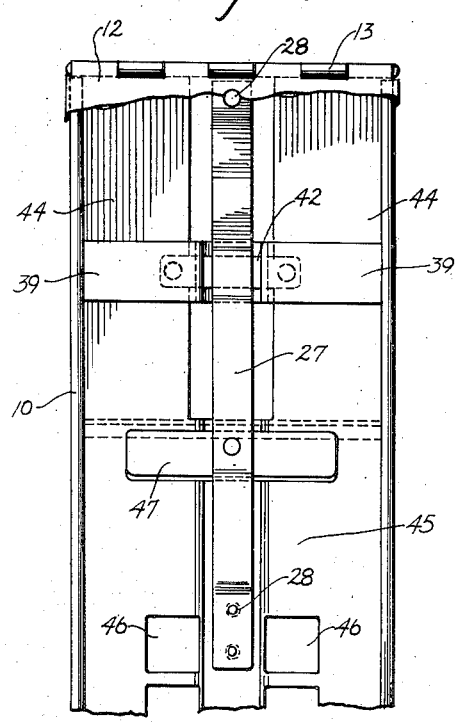
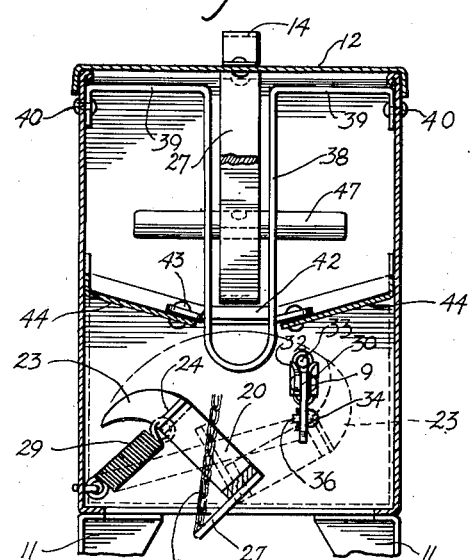
Martin J. Schoger
INVENTOR
BY Victor J. Evans & Co.
ATTORNEYS Patented Aug. 9, 1949

2,478,209

UNITED STATES PATENT OFFICE 2,478,209

HUMANE CHICKEN KILLER

Martin J. Schoger, Chicago, Ill.

Application August 1, 1946, Serial No. 687,566

5 Claims. (Cl. 17—12)

1

This invention relates to a chicken killer and has for an object to provide a device of this character in which the chicken, or other poultry is enclosed in a casing so as to be out of sight, the knife being set or cocked to operative position by opening of the cover of the casing, and being tripped and moved across the principal arteries of the chicken's neck when the cover is closed so that the chicken is killed humanely and without distress to the operator.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 4 is a longitudinal sectional view of the chicken killer showing the cover closed and the knife rocked to sever the veins and arteries in the neck of a chicken confined within the casing.

Figure 5 is a horizontal sectional view taken on the line 5—5 of Figure 4.

Figure 6 is a vertical sectional view taken on the line 6—6 of Figure 4.

Figure 1:
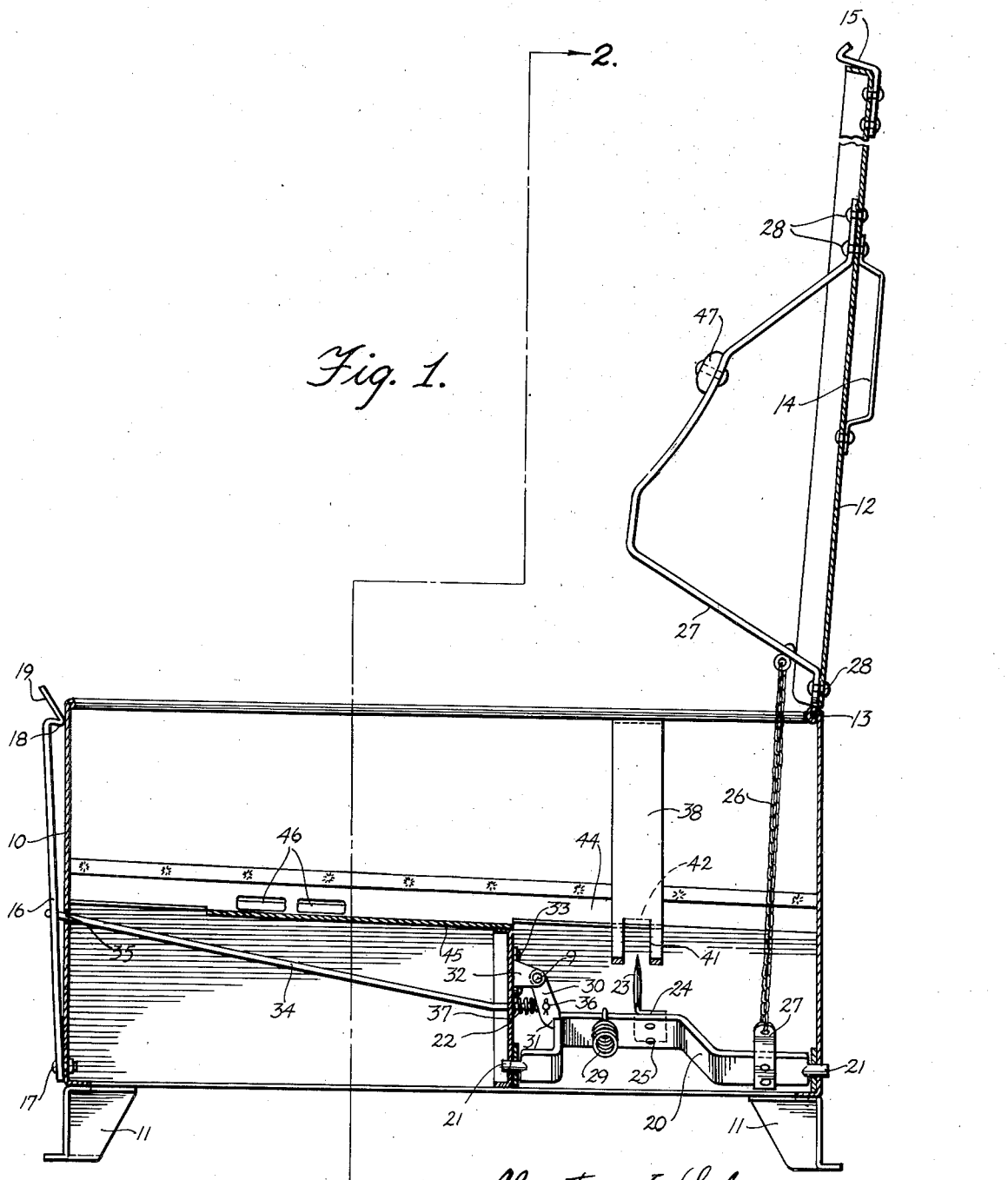
Figure 1 is a longitudinal sectional view of a chicken killer constructed in accordance with the invention, the cover being shown open and the knife being shown held in cocked position.

Referring now to the drawing in which like characters of reference designate similar parts in the various views, 10 designates a casing, preferably formed of sheet metal and of substantially rectangular longitudinal section and cross section. The casing is open at the bottom and is elevated above the ground or floor by short legs 11. The casing is provided with a cover 12 which is hinged at one end to one of the end walls of the casing as shown at 13 and is provided with a strap handle 14 and also at the free end is provided with a leaf spring hook 15 forming one of the coacting parts of a latch. The other coacting part of the latch is provided by a leaf spring 16

2 which is disposed exteriorly of the other end wall of the casing and is bolted at the bottom to the casing as shown at 17 in Figure 1. The leaf spring 16 inclines outwardly and upwardly from the adjacent end wall of the casing and is provided with a hook 18 on the free end, which terminates in an inclined tip 19 over which the leaf spring hook 15 rides to engage underneath the hook 18 to hold the cover closed. When the inclined tip 19 is moved outwardly from the casing the handle 14 may be grasped to disengage the hook 15 from the hook 18 and open the cover. This operation sets or cocks the knife as will now be described.

A crank shaft 20, formed of strap metal is provided at the ends with gudgeons 21 which are journaled in an end wall of the casing and in a vertical partition 22 in the casing, the partition terminating below the median line of the casing. An arcuate knife 23, see Figure 6 is provided with an angularly disposed foot 24, which is riveted as shown at 25 to the crank of the crank shaft. A chain 26 is secured at the lower end to a lug 27 which extends from one of the straight ends of the crank shaft and at the upper end is connected to a bar 27 of irregular contour, but somewhat arcuate, again see Figure 2, which is secured at the ends to the inner face of the cover by rivets 28 or other connectors. When the cover is swung open the rock shaft is rocked to the position shown in full lines in Figure 6 to set or cock the knife against the pull of a helical spring 29 which is connected to the crank of the crank shaft and to one of the side walls of the casing.

Figure 2:
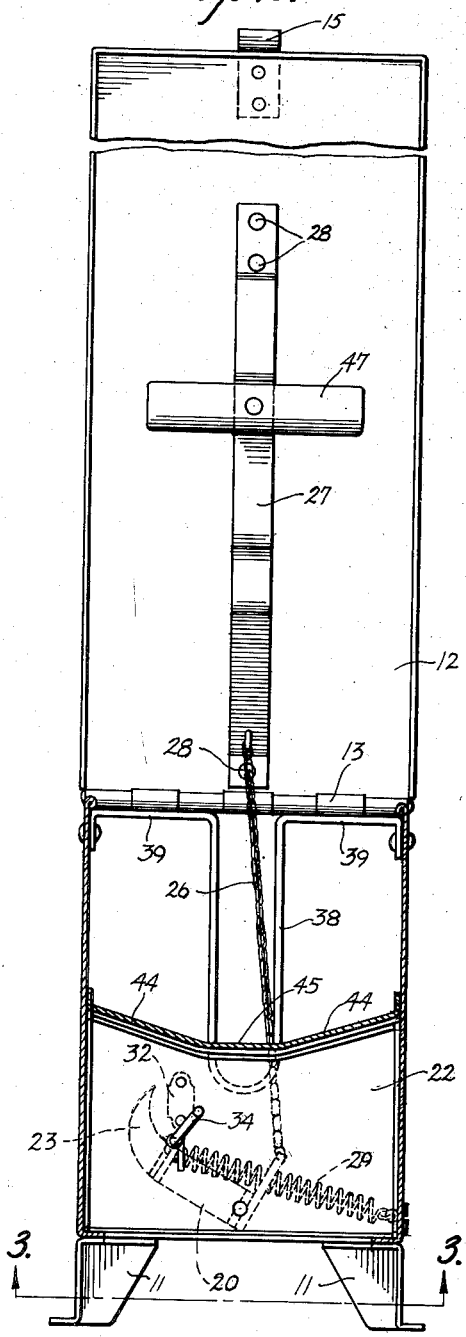
Figure 2 is a vertical sectional view of the chicken killer taken on the line 2—2 of Figure 1.
Figure 3:
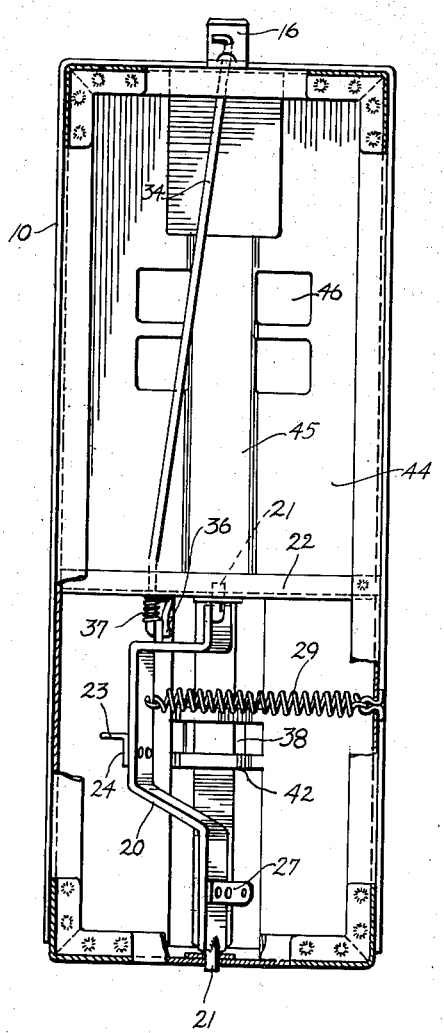
Figure 3 is a cross sectional view of the chicken killer taken on the line 3—3 of Figure 2.

The knife is latched in set or cocked position through the medium of a dog 30, see Figure 2 having an angular recess 31 to engage over the crank of the crank shaft and yieldably hold the knife in set or cocked position. The dog is pivoted at one end as shown at 9 in Figure 1 to a lug 32 which is riveted as shown at 33 or otherwise secured to the vertical partition 22.

For releasing the dog 30 to allow the knife to be rocked through the killing stroke a rod 34 is engaged through an opening 35 in one end wall of the casing and is connected to the leaf spring 16. The opposite end of the rod is engaged through an opening in the partition and has an extreme end bent laterally as shown at 36 and engaged through an opening in the dog. A helical spring 37 is sleeved on the rod between the dog and the partition 22 to yieldably hold the dog in engagement with the crank of the crank shaft when the cover is open, see Figure 1. When the cover 12 is closed the spring hook 15 rides down the inclined tip 19 of the spring hook 16 and moves the spring 16 outwardly to pull the rod 34 outwardly and pull the dog 30 out of engagement with the crank of the crank shaft so that the spring 29 may contract in the direction of its length and rock the rock shaft from the dotted line position shown in Figure 6 to the full line position shown in Figure 6, to sever the arteries in the neck of the chicken which is confined within the casing as will now be described.

A yoke 38, of substantially U form, is suspended vertically from the side walls of the casing, at the center of the casing, through the medium of transversely disposed arms 39 which are riveted as shown at 40 to the side walls of the casing near the top thereof, see Figure 6. The yoke is in the path of the knife 23 and is provided with a recess 41 at the bottom through which the knife passes, see Figures 1 and 6. The yoke receives the neck of the chicken which is confined in the bottom of the yoke through the medium of a transversely disposed bar 42, see Figure 6, which is secured at the ends by rivets 43, or other connectors to downwardly inclined plates 44 which are secured at the outer ends to the inner faces of the side walls of the casing and are connected together at a point spaced rearwardly of the yoke by a plate 45, see Figure 4, which extends from the top of the partition 22 to that end wall of the casing upon which the spring hook 16 is mounted. When the cover is opened the chicken may be placed upon the plate 45 and its legs thrust through openings 46 formed in the plate 45, there being a plurality of these openings to interchangeably receive the legs of various sizes of chickens, while the neck of the chicken is stretched through the yoke 38 underneath the bar 42 as shown by dotted lines in Figure 4 so as to be in the path of the knife.

A hold down transversely disposed bar 47 is disposed on the bar 27 heretofore mentioned so that when the cover is closed the bar 47 will engage the chicken at what may be termed the shoulders of the chicken and hold the chicken firmly down upon the plate 45 so that the chicken will be confined in the casing both by the hold down bar 47 and by virtue of the legs put through the openings 46. At the moment the cover is closed, as heretofore described, the knife is rocked by its controlling spring 49 to pass through the recess 41 in the yoke and cleanly sever the arteries and veins in the chicken's neck.

From the above description it is thought that the construction and operation of the invention will be fully understood without further explanation.

What is claimed is:

1. A chicken killer comprising, a casing open at the top and at the bottom, a cover for the top of the casing hinged at one end to the casing, a crank shaft extending longitudinally in the casing, a knife on the crank of the crank shaft, a connector connecting the crank shaft to the cover to swing the crank shaft to move the knife to cocked position, a spring connected to the crank shaft and to the casing to move the knife through the operating stroke, latch means for releasably holding the crank shaft in position to hold the knife cocked, coacting means carried by the casing and the cover and connected to the latch means for releasing the latch means when the cover is closed to permit the knife to be spring urged through the operating stroke, and means for supporting a chicken within the casing with the neck stretched and confined in the path of the operating stroke of the knife.

2. The structure as of claim 1 and in which the connector connecting the crank shaft to the cover comprises a chain adapted to be pulled when the cover is opened.

3. The structure as of claim 1 and in which the latch means comprises a transverse partition in the casing, and a dog hinged to the partition having an angular recess adapted to receive the crank of the crank shaft to hold the knife cocked.

4. The structure as of claim 1 and in which the coacting means for releasing the latch means comprises a leaf spring hook on the free end of the cover, a leaf spring on the casing having a hook at the free end and terminating at the free end in an outwardly inclined tip, and a rod connected to the leaf spring and slideably engaged through the casing and the partition, said rod being connected to the latch means, the arrangement being such that when the cover is closed the leaf spring hook of the cover engages the outwardly inclined tip of the leaf spring of the casing and moves the leaf spring outwardly to withdraw the rod and release the latch means from the crank of the crank shaft.

5. A structure as of claim 1 and in which the means for supporting a chicken within the casing comprises a yoke to receive the neck of the chicken back of the head, said yoke having a recess in the bottom through which the knife passes on its operating stroke to cut the principal arteries and veins of the neck of the chicken, downwardly inclined plates on each side of the yoke, a bar carried by the plates passing across the yoke to hold the chicken's neck in the yoke, a plate extending transversely of the casing integral with the downwardly inclined plates in rear of the yoke having openings, the plate being adapted to support the body of the chicken with the legs of the chicken thrust downward through the openings, and a transversely disposed hold down bar carried by the cover adapted to engage the shoulders of the chicken and hold the chicken on the plate when the cover is closed.

MARTIN J. SCHOGER.

REFERENCES CITED

The following references are of record in the file of this patent:

UNITED STATES PATENTS

| Number | Name | Date |
|---|---|---|
| 1,729,845 | Sawicki | Oct. 1, 1929 |